March 11, 1930.  J. F. PULFORD  1,750,543
PRESSURE HEAD
Filed April 20, 1928   2 Sheets-Sheet 1
Fig. 1.
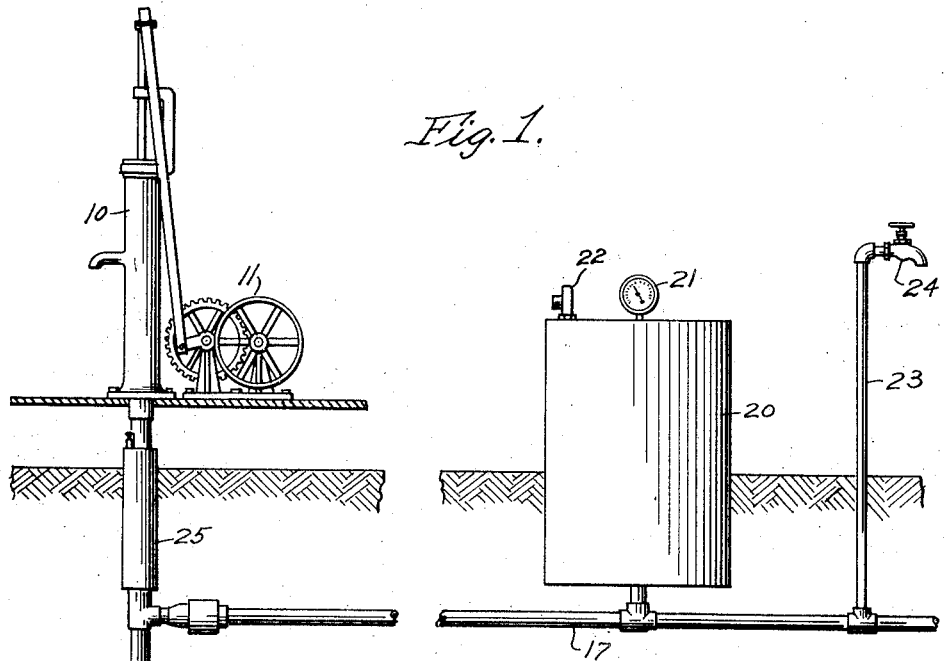
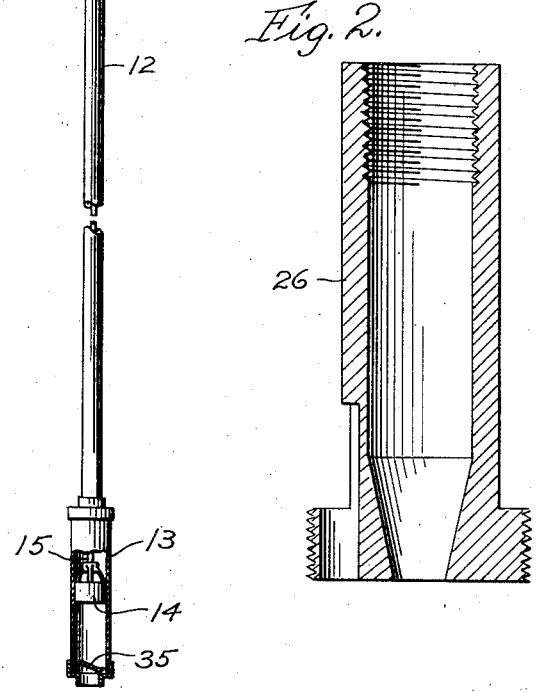
Fig. 2.
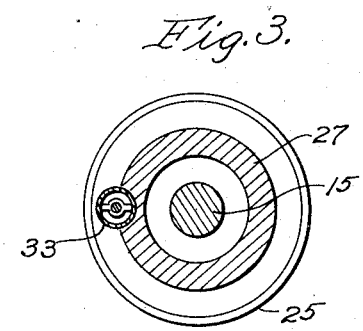
Fig. 3.
John F. Pulford
INVENTOR
BY Victor J. Evans
ATTORNEY March 11, 1930.  J. F. PULFORD  1,750,543
PRESSURE HEAD
Filed April 20, 1928   2 Sheets-Sheet 2
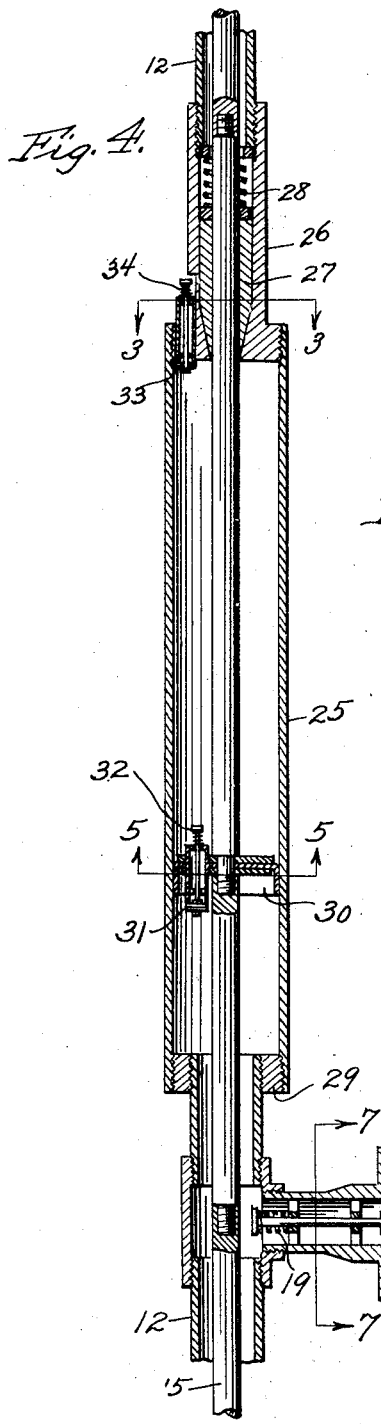
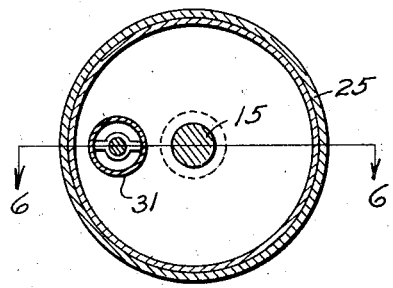
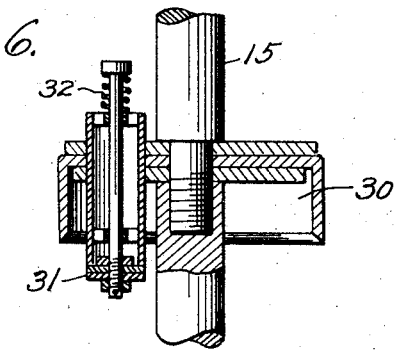
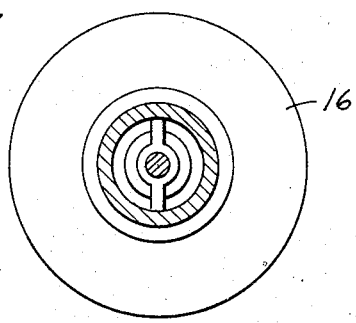
John F. Pulford
INVENTOR
BY Victor J. Evans
ATTORNEY Patented Mar. 11, 1930

1,750,543

UNITED STATES PATENT OFFICE

JOHN F. PULFORD, OF BOISE, IDAHO, ASSIGNOR OF ONE-HALF TO DANIEL F. HACKETT, OF BOISE, IDAHO

PRESSURE HEAD

Application filed April 20, 1928. Serial No. 271,512.

This invention relates to improvements in hydropneumatic pumping systems, an object being to provide a system wherein water is pumped from a well into a storage tank, the pump which lifts the water from the well also supplying the air pressure within the tank to distribute the water, as well as to aerate the same and keep it fresh.

Another object of the invention is the provision of a system which includes a novel construction of pressure head for supplying water and air pressure to a tank, and for aerating the water.

With the above and other objects in view, the invention further includes the following novel features and details of construction, to be hereinafter more fully described, illustrated in the accompanying drawings and pointed out in the appended claim.

In the drawings:—

Figure 1 is a view illustrating the system.

Figure 2 is an enlarged detail sectional view of the coupling for connecting the pressure system to the drop pipe.

Figure 3 is an enlarged transverse sectional view on the line 3—3 of Figure 4.

Figure 4 is an enlarged vertical sectional view through the pressure head and the coupling between te drop pipe and the supply pipe.

Figure 5 is an enlarged sectional view on the line 5—5 of Figure 4.

Figure 6 is a section on the line 6—6 of Figure 5.

Figure 7 is a sectional view on the line 7—7 of Figure 4.

Referring in detail to the drawings wherein like characters of reference denote corresponding parts, the reference character 10 indicates the usual force pump head which may be operated by any suitable means, for example, through the medium of a pump jack illustrated at 11. Extending downward from the pump 10 is a drop pipe 12 which carries at its lower end a pump cylinder 13 within which operates a plunger 14. This plunger is carried at the lower end of a plunger rod 15 which extends upward through the drop pipe and which is operated to lift water from a well in the usual manner.

Extending from the drop pipe 12 and connected thereto through the medium of a coupling 16 is a distributing pipe 17, the coupling 16 also providing a housing for a check valve 18 which is yieldingly held in closed position through the medium of a spring 19. The pipe 17 is in communication with a combined pressure and storage tank 20 and the latter may be provided with a pressure gauge 21 and a relief valve 22. The pipe 17 is also in communication with a discharge pipe 23 which may be provided with a spigot 24.

Located within the length of the drop pipe 12 is a pressure head which includes a cylinder 25 whose upper end is connected to the drop pipe 12 by means of a coupling 26. Located within this coupling is a combined plunger rod guide and packing 27 which is yieldingly held seated by means of a spring 28. The lower end of the cylinder 25 is connected to the drop pipe 12 through the medium of a ring 29.

Operating within the cylinder 25 and secured to the plunger rod 15 is a plunger 30. This last mentioned plunger is provided with a check valve 31 which is closed upon the downward stroke of the plunger and which opens against the action of a spring 32 as the plunger moves upward. The coupling 26 is also provided with a check valve 33, similar to the valve 31, which opens against the action of a spring 34 on the down stroke of the plunger and closes on the up stroke, so that air will be drawn into the cylinder 25 as the plunger moves downward.

It will be seen from the foregoing description and accompanying drawings that as the plunger rod 15 moves upward, water is drawn into the pump cylinder 13, and upon the downward stroke of the plunger rod, water will be forced above the plunger 14, the lower end of the cylinder being closed by a check valve 35. On the upward stroke of the plunger, air in the upper part of the cylinder 25 passes through the valve 31 which is opened by pressure in the upper part of the cylinder. Also, on the upstroke of the piston part of the rising water column is forced through the valve 18 and into the tank 20.

On the down stroke of the piston, some additional water will be forced through said valve 18, and when the water level falls to this valve, air will pass through said valve and into the tank 21 to aerate the water and provide air pressure within the tank.

The invention is susceptible of various changes in its form, proportions and minor details of construction, and the right is herein reserved to make such changes as properly fall within the scope of the appended claim.

Having described the invention what is claimed is:—

In a hydro-pneumatic pumping system, a pump including a drop pipe and a plunger rod operating therein, a storage tank, a supply pipe extending from the drop pipe and having communication with said tank, a check valve to control communication between the drop pipe and supply pipe, and a pressure head located in the drop pipe above the supply pipe, said head including a pressure cylinder of relatively large diameter having its opposite ends connected to and in communication with the drop pipe, a plunger carried by the plunger rod of the pump and operating within the pressure cylinder, a valve controlled air inlet for the pressure cylinder, a check valve for the plunger, and a tapered yieldingly seated combined plunger rod guide and packing surrounding the plunger rod at the juncture of the pressure cylinder and drop pipe.

In testimony whereof I affix my signature.

JOHN F. PULFORD.